(12) United States Patent
Doumbos

(10) Patent No.: US 11,220,966 B2
(45) Date of Patent: Jan. 11, 2022

(54) TURBOCHARGER WASTEGATE CONTROLLER

(71) Applicant: TURBOSMART PTY LIMITED, Wetherill Park (AU)

(72) Inventor: Christopher Doumbos, Wetherill Park (AU)

(73) Assignee: TURBOSMART PTY LIMITED, Wetherill Park (AU)

(*) Notice: Subject to any disclaimer, the term of this patent is extended or adjusted under 35 U.S.C. 154(b) by 0 days.

(21) Appl. No.: 17/089,063

(22) Filed: Nov. 4, 2020

(65) Prior Publication Data

US 2021/0131365 A1    May 6, 2021

(30) Foreign Application Priority Data

Nov. 4, 2019   (AU) ................................ 2019904150

(51) Int. Cl.
*F02D 41/00*    (2006.01)
*F02B 37/18*    (2006.01)

(52) U.S. Cl.
CPC ........ *F02D 41/0007* (2013.01); *F02B 37/183* (2013.01); *F05D 2220/40* (2013.01)

(58) Field of Classification Search
CPC .. F02D 41/0007; F02B 37/183; F02B 37/186; F02B 77/082; F02B 77/086; F02B 39/16; F05D 2220/40; Y02T 10/12
See application file for complete search history.

(56) References Cited

U.S. PATENT DOCUMENTS

2018/0112593 A1   4/2018  Lehnert et al.
2020/0217243 A1   7/2020  Daxberger et al.

FOREIGN PATENT DOCUMENTS

WO      2011032827 A2      3/2011
WO   WO-2011032827 A2 *    3/2011  ........... F02D 9/1065
WO      2019057419 A1      3/2019

OTHER PUBLICATIONS

Search Report of United Kingdom Application No. GB2017393.6, dated Mar. 22, 2021, 4 pages.

* cited by examiner

*Primary Examiner* — Audrey B. Walter
*Assistant Examiner* — Edward Bushard
(74) *Attorney, Agent, or Firm* — Quarles & Brady LLP; James J. Aquilina

(57) ABSTRACT

A turbocharger wastegate controller 10 includes a servo motor 11 having an electrical supply input and a motor output shaft 12 configured to be attached to a wastegate valve 22. Rotation of the motor output shaft 12 in a first direction moves the wastegate valve 22 toward a fully open butterfly valve position and rotation in the opposite direction toward a fully closed actuator position. In the controller 10, the electrical supply input to the servo motor 11 is controlled to modify the wastegate valve 22 position to control boost pressure of a turbocharger.

18 Claims, 17 Drawing Sheets

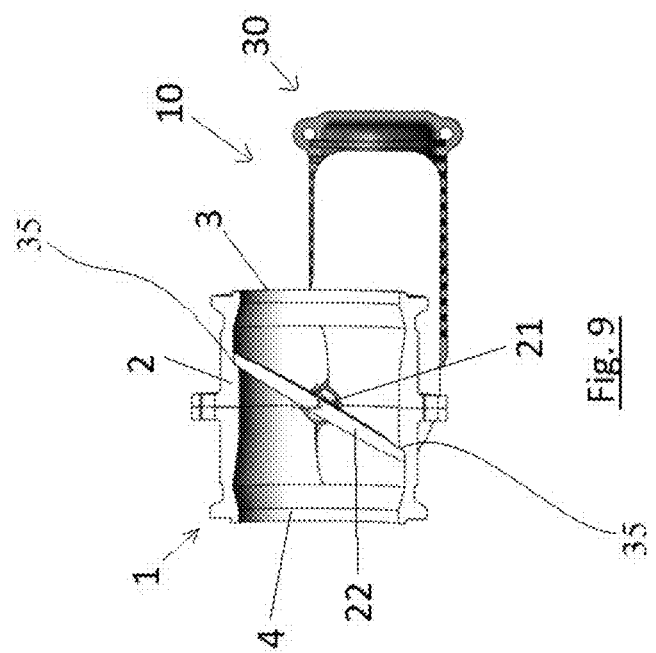
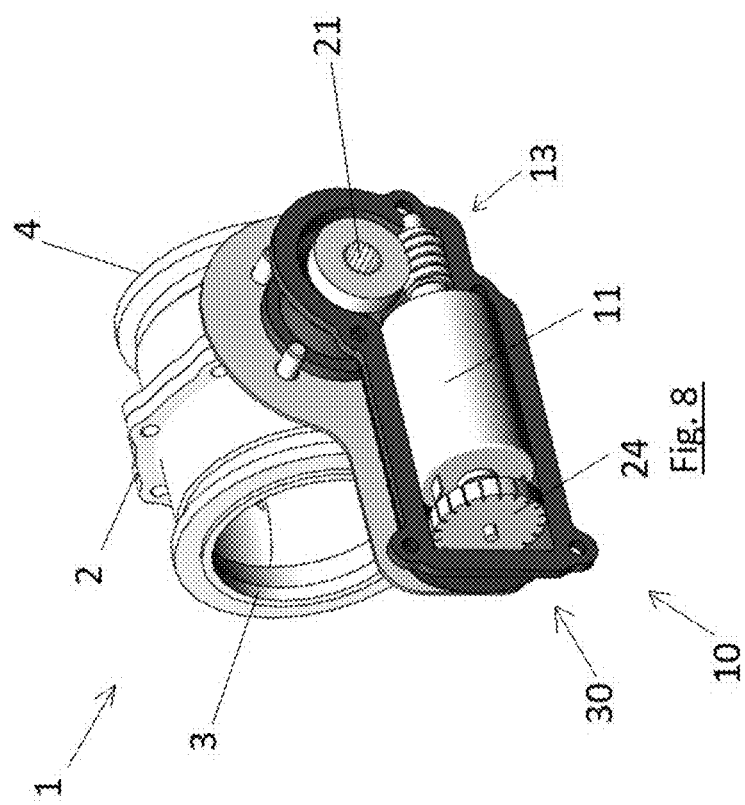
Fig. 8
Fig. 9

TURBOCHARGER WASTEGATE CONTROLLER

FIELD OF THE INVENTION

The present invention relates to boost control for turbocharged or supercharged engines and, in particular, to a turbocharger or supercharger wastegate controller.

The invention has been developed primarily for use with controlling a wastegate of an exhaust driven turbocharger and will be described hereinafter with reference to this application. However, it will be appreciated that the invention is not limited to this particular field of use and is applicable to crank or belt driven superchargers.

BACKGROUND OF THE INVENTION

Turbocharging of engines has long been known to both improve efficiency and also to increase power or improve performance. As is commonly understood, a turbocharger employs engine exhaust to drive a turbine which is used to draw in air and force or compress this for injection into cylinders of the engine. This produces a desired amount of positive air pressure to the air inlet of the combustion engine. So far as cylinders can only operate at a predetermined rate, use of a turbocharger allows more air to be delivered to an engine cylinder for combustion thereby allowing the burning of more fuel consequently providing more power.

Turbochargers often include a wastegate which is employed to divert exhaust gases passing the turbines driven by the exhaust gas. In such cases, the exhaust gas is diverted downstream of a turbocharger to atmosphere. The opening of a wastegate, typically in the form of a valve, reduces the turbine speed by reducing the incident exhaust pressure resulting in less air being delivered to the engine by the turbocharger. As is well understood, it can be particularly important to protect an engine from overpressure produced by a turbocharger as such is known to seriously damage an engine or a turbocharger itself.

Wastegates can be disposed internally in the turbocharger housing and essentially employ a gate or flap that is movable in response to a predetermined exhaust pressure to allow the exhaust to bypass the turbocharger turbine and re-enter the exhaust downstream. When pressures are lower then desired, the wastegate closes, increasing the speed of the compressor wheel. Wastegates can also be disposed externally to the turbocharger and these are typically found on aftermarket turbocharger wastegate products. Such wastegate products use a pressure actuator such that excess pressure at the turbocharger engine exhaust inlet causes a valve to actuate against a bias spring allowing the wastegate to open. This is particularly useful in aftermarket turbocharger wastegates which do not generally provide the same level of tolerance in manufacture or design compatibility of an original equipment manufacturer of wastegates and a user may "over boost" the turbocharger.

Such an arrangement is useful in operating the turbocharger and preventing some overpressure but in some environments the wastegate is not actuated rapidly enough and only a manifold vacuum pressure or other pressure sensor is used to provide input to actuate the wastegate. For example, the use of vacuum pressure or boost pressure actuating the wastegate. Furthermore, conventional aftermarket wastegates do not allow for the selective bleeding of the engine exhaust prior to entry to the turbocharger turbine. It is known in conventional wastegates when moved from a closed to an open position in response to pressure do not practically correct minor overpressure or to allow minor wastegate opening to adjust for turbocharger stutter where a significant back pressure is provided on the turbines by the air compressed by the turbocharger intermediate the turbocharger and an engine cylinder/air intake. It will be appreciated that existing aftermarket wastegates provide reactive systems where typically an undesired effect is attained immediately prior to the desired effect when the wastegate actuation mechanism is tuned overly aggressively.

Generally, modern wastegates allow for control of turbine shaft speeds, while the control of these devices is mainly operated on a reactive system, i.e.—compressor pressure (a function of turbine speed, as such, a delay is immediately introduced) is monitored/manipulated via the wastegate, once a certain pressure is exceeded, the mechanical device needs to react, overcome any sources of hysteresis/stiction and then the pressure drop allows for exhaust gas to flow an alternative path to the turbine wheel allowing for a steady controlled turbine shaft speed. As a result, typically the pressure either is below/close/exceeds the pressure target and in many instances needs to be corrected "after" the fact, as a result, a reactive system.

Known monitoring/boost control strategy on high performance turbochargers is to monitor turbine shaft speed, to ensure the turbo does not exceed a given shaft speed. To accurately maintain this shaft speed via the use of a pressure based (reactive) system is risky as there will be instances where the shaft speed exceeds the limit due to a time delay in the system as the reactive wastegate has the ability to react.

GENESIS OF THE INVENTION

The genesis of the invention is a desire to provide turbocharger wastegate that is non-reactive and overcomes one or more of the disadvantages of the prior art, or to provide a useful alternative.

SUMMARY OF THE INVENTION

According to a first aspect of the invention there is provided a turbocharger wastegate controller comprising:
  a servo motor having an electrical supply input and a motor output shaft;
  a gear train having an input connected to said motor output shaft and a gear train output, said gear train having a predetermined input to output gear ratio;
  a lead screw having an elongate shaft with a lead screw head configured to be attached to a wastegate actuator, said lead screw being threadedly engaged with the gear train output such that rotation of the gear train output in the first direction moves said lead screw linearly in a first direction toward a fully open actuator position and rotation in the opposite direction toward a fully closed actuator position;
  characterised in that said electrical supply input to said servo motor is controlled to modify the wastegate position to control boost pressure of a turbocharger.

According to a second aspect of the invention there is provided a turbocharger wastegate controller comprising:
  a servo motor having an electrical supply input and a motor output shaft configured to be attached to a wastegate butterfly valve actuator such that rotation of said motor output shaft in a first direction rotates a wastegate actuator toward a fully open butterfly valve position and rotation in the opposite direction toward a fully closed actuator position;

characterised in that said electrical supply input to said servo motor is controlled to modify the wastegate position to control boost pressure of a turbocharger.

According to another aspect of the invention there is provided a turbocharger wastegate controller comprising:

a servo motor having an electrical supply input and a motor output shaft;

a gear train having an input connected to said motor output shaft and a gear train output, said gear train having a predetermined input to output gear ratio;

a lead screw having an elongate shaft with a lead screw head configured to be attached to a wastegate butterfly valve actuator, said lead screw being threadedly engaged with the gear train output such that rotation of the gear train output in the first direction moves said lead screw linearly in a first direction toward a fully open actuator position and rotation in the opposite direction toward a fully closed actuator position;

characterised in that said electrical supply input to said servo motor is controlled to modify the wastegate position to control boost pressure of a turbocharger.

It can therefore be seen that there is advantageously provided an aftermarket turbocharger wastegate controller that can operate predictively rather than purely reactively. By employing electronic wastegate control with DC servo motor control, the position of the bypass valve (weather this is butterfly/rotary or poppet) can be independently mapped in comparison to the turbine shaft speed, as a result a function can be created to ensure that the wastegate is moving in a position according to the turbocharger shaft speed limit or a control bandwidth. While the electronic wastegate may be able to respond much quicker than the turbo shaft speed, the idea of being able to respond much quicker than the turbocharger due to inertia in practice is equivalent to anti-aliasing with sensor sampling allowing for the controller system not to operate in zones of "aliasing" avoiding undesirable control effects such as ghosting of signals.

BRIEF DESCRIPTION OF THE DRAWINGS

Preferred embodiments of the invention will now be described, by way of example only, with reference to the accompanying drawings in which:

FIG. 8 is a front right perspective view of a turbocharger wastegate controller according to a further preferred embodiment attached to an external wastegate;

FIG. 9 is a partial cut-away section view of the controller and wastegate of FIG. 8.

DETAILED DESCRIPTION

Figure 1:
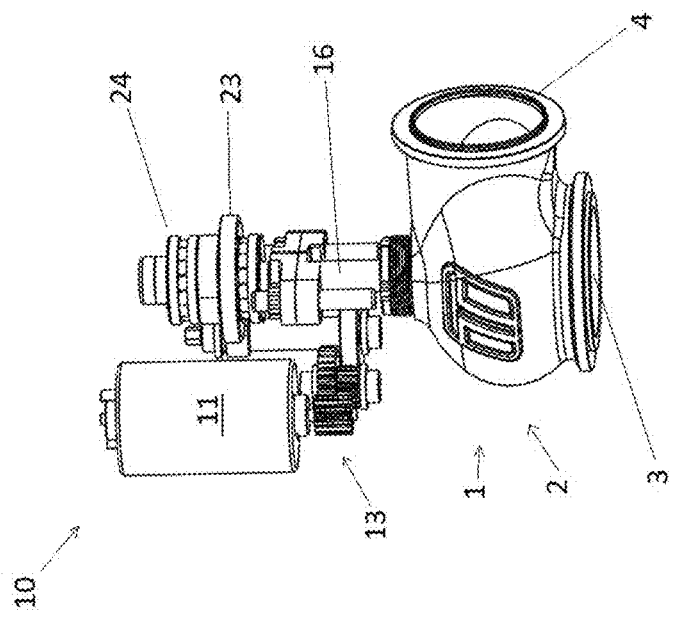
FIG. 1 is a front left perspective view of a turbocharger wastegate controller according to a preferred embodiment attached to an external wastegate.
Figure 2:
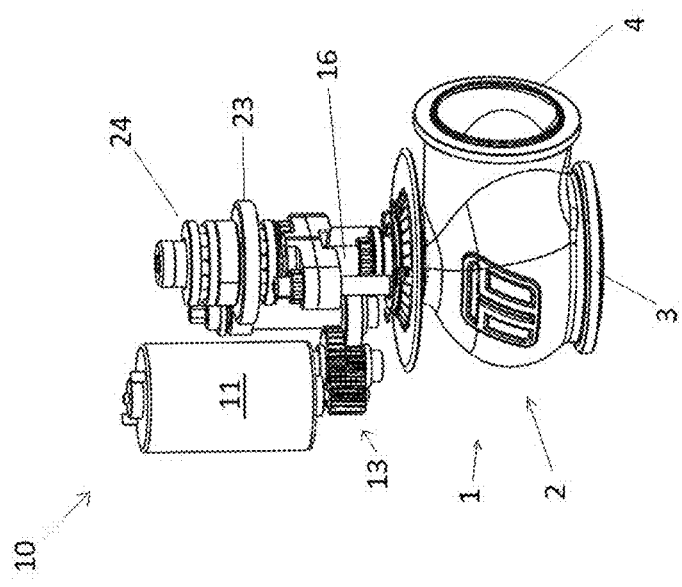
FIG. 2 is a left-hand side perspective view of the controller of FIG. 1.
Figure 3:
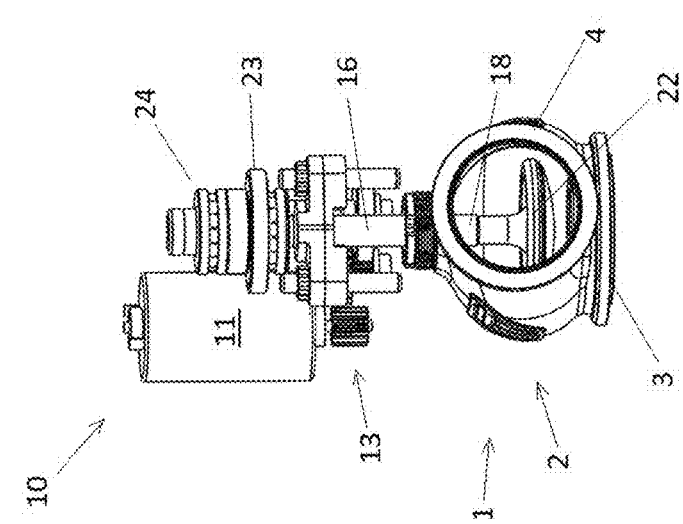
FIG. 3 is a right-hand rear perspective view of the controller of FIG. 1.
Figure 4:
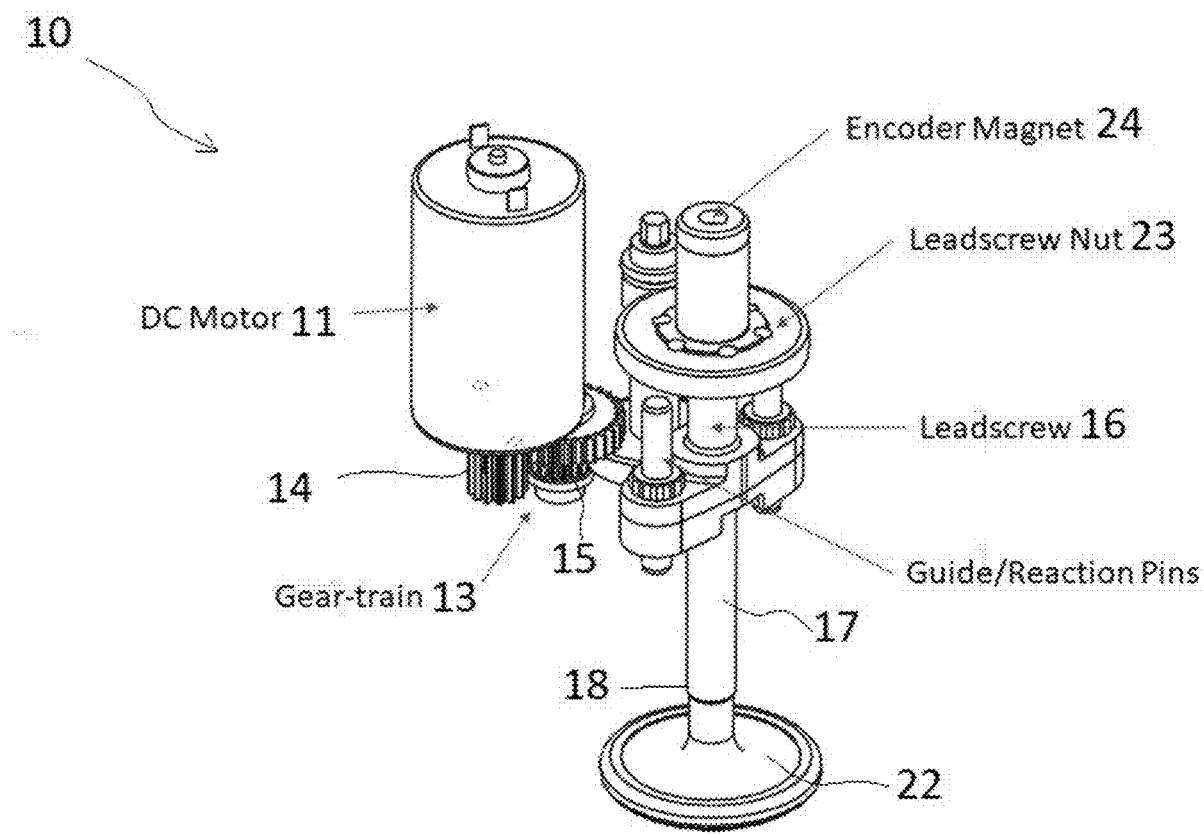
FIG. 4 is an isolated elevated perspective view of components of the controller of FIG. 1.
Figure 5:
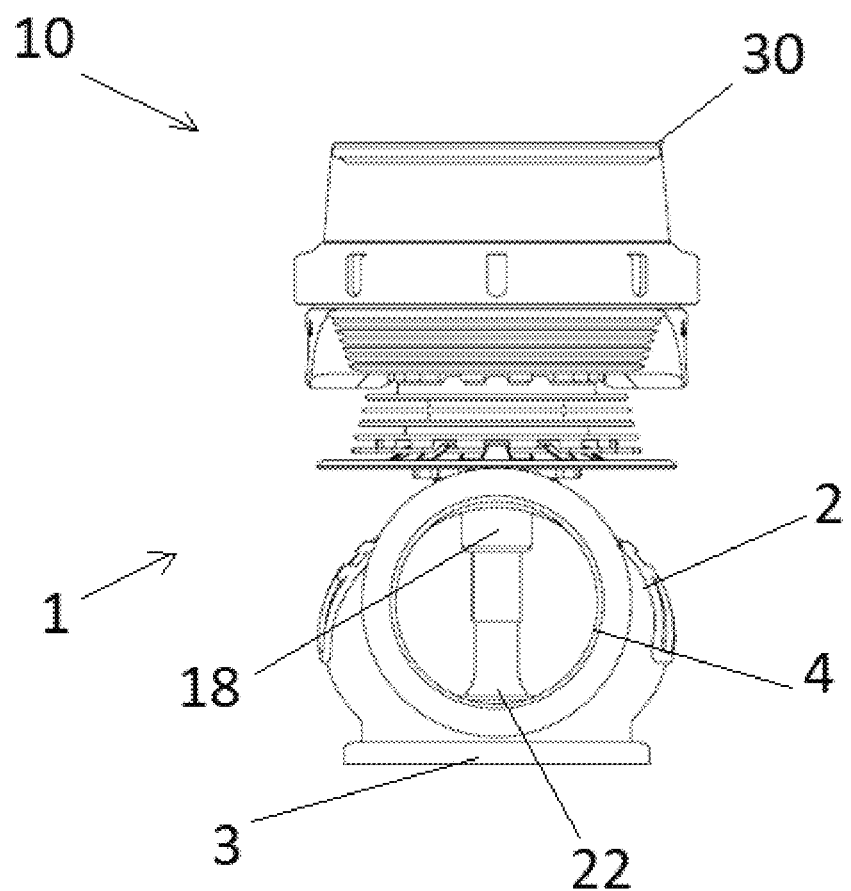
FIG. 5 is a front view of the controller of FIG. 1 enclosed in a housing attached to the external wastegate.

Referring to the drawings generally, like reference numerals are used to denote like components unless expressly noted otherwise. Referring to FIGS. 1 to 5, there is shown a first preferred embodiment of an external turbocharger wastegate 1. Wastegate 1 includes a housing 2 having an inlet port 3 in communication with an engine exhaust outlet (not illustrated) upstream of a turbocharger (also not illustrated). The housing 2 has an outlet 4 adapted to be vented to atmosphere or a vehicle exhaust downstream of the turbocharger.

The external wastegate includes a turbocharger wastegate controller 10. Controller 10 includes a DC servo motor 11 having an electrical supply input (not illustrated) to power the motor 11. The motor 11 has a motor output shaft 12. Controller 10 further includes a gear train 13 having an input 14 connected to the motor output shaft 12 and a gear train output 15. The gear train 13 has a predetermined input to output gear ratio.

A lead screw 16 with an elongate shaft 17 terminates at one end at a lead screw head 18 configured to be attached to a wastegate actuator 20. The lead screw shaft 17 is threadedly engaged with the gear train output 15 where rotation of the gear train output 15 in the first direction moves the lead screw 16 linearly (ie along the axis of shaft 17) in a first direction toward a fully open actuator position (best seen in FIG. 1). Rotation of the gear train output 15 in the opposite direction moves the lead screw 16 linearly toward a fully closed actuator position (best seen in FIG. 5).

The servo motor 11 is controlled to selectively control the lead screw 16 position so as to modify a wastegate valve 22 position to control boost pressure of a turbocharger. The wastegate 22 is in the form of a poppet valve mounted to the lead screw head 18. The poppet valve 22 moves between the wastegate fully closed actuator position (FIG. 5) and the fully open actuator position (FIG. 1). Preferably the poppet valve 22 has a diameter of between 20 mm to 80 mm most preferably 40 mm to 60 mm. In this way, a wide variety of vehicles can receive wastegate 22 and controller 10.

A lead screw nut 23 is disposed adjacent the end of the lead screw 16 that is opposed to the screw head 18. The lead screw nut 23 is mounted to a controller body 30 (shown in FIG. 5) whereby rotation of the lead screw 16 moves it and the valve 22 linearly away or toward the closed valve position. Motor 11 also includes an encoder magnet 24 disposed at the end 25 of the lead screw 16 opposed to the lead screw head 18. The encoder magnet is configured to monitor rotational motion of lead screw 16 to ensure correct linear positioning of the valve 22. In preferred embodiments, the encoder 24 includes at least one Hall effect sensor (not clearly illustrated).

The servo motor 11 DC electrical input is provided by the ECU of an engine to which the turbocharger is attached. This can be implemented by any preferred means, not illustrated. For example, the input signal to control motor 11 and lead screw 16 linear position and hence valve 22 position can be is controlled/provided by the vehicle CAN bus operating a servo motor PWM input drive controlling a DC voltage input. In such a case, a 0% PWM duty cycle input causes the lead screw 16 to be in the fully closed actuator position and 100% PWM duty cycle causes the lead screw to be in the fully open actuator position. Operating within 0%-100% the PWM can cause the DC servo motor to be driven to any valve 22 position between fully open and closed corresponding to required engine exhaust bleed through wastegate valve 22 to maintain or provide a desired turbocharger output to the engine.

In the preferred embodiment, the servo motor 11 is configured to rotate the lead screw 16 moving its location between the fully closed actuator position and a predetermined linear distance corresponding to the fully open actuator position. Most preferably, the predetermined linear distance is between 10 mm to 30 mm for some embodiments, or between 12 mm to 19 mm in others.

The poppet valve 22 is adapted in preferred embodiments to move into the fully closed actuator position against an engine exhaust pressure of between 10 bar to 200 bar. In some preferred embodiments, valve 22 is configured to move against exhaust pressures of up to 30 to 40 bar.

The DC servo motor under preferred practical environments is adapted to wind the lead screw 16 and move valve 22 between the fully closed and fully open actuator positions in less than 500 ms. However, in higher performance applications this time is preferably less than 250 ms or even less than 125 ms.

As noted above, movement of the actuator valve 22 from the fully closed position bleeds engine exhaust to atmosphere or to an engine exhaust downstream of a turbocharger from the engine exhaust via the housing outlet 4.

In the preferred embodiment of FIGS. 1 to 5, the lead screw 16 includes a 10 mm diameter shaft with a 2 mm thread pitch. The gear train 13 provides a gear reduction of approximately 15.9:1 and is preferably in the range 2:1 to 30:1. Ideally, the servo motor 11 has a stall torque between 0.10 to 0.30 Nm and an average torque of 0.15 to 0.45 Nm.

It is most desirable to have a fail-safe mechanism in the event of operation problems with servo motor 11 or the control signal such as when supplied by an engine ECU. This is to avoid the valve 22 from being retained in the fully closed position whereby the turbocharger turbine may overspin and/or produce excessive output pressure. In the preferred embodiment, the DC servo motor 11 is configured to move the lead screw 16 in response to a power failure to a position being 30% to 60% of said actuator valve 22 fully open position.

Figure 6:
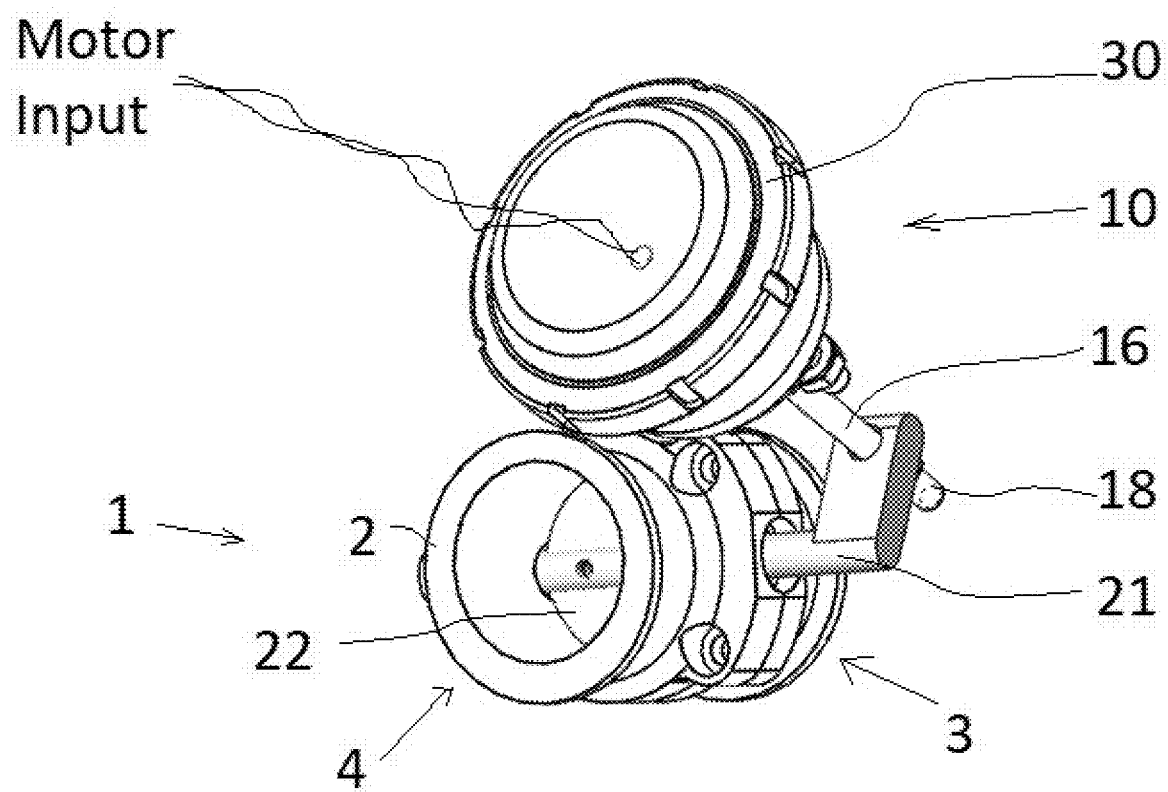
FIG. 6 is an elevated perspective view of the wastegate controller of FIG. 1 mounted to a butterfly valve wastegate.

In another preferred embodiment of the invention shown in FIG. 6, the lead screw 16 head 18 is connected directly or via a rigid arm to a turbocharger internal wastegate actuator. The internal wastegate is actuated by an external actuator actuated by means of wastegate controller 10 operating the position of lead screw 16 and corresponding position of the wastegate actuator of the internal turbocharger wastegate.

So far as modern wastegates allow for control of turbine shaft speeds, the control of these devices is mainly operated on a reactive basis on prior known systems, i.e.—compressor pressure (a function of turbine speed, as such, a delay is immediately introduced) is monitored/manipulated via the wastegate, once a certain pressure is exceeded, the mechanical device needs to react, overcome any sources of hysteresis/stiction and then the pressure drop allows for exhaust gas to flow an alternative path to the turbine wheel allowing for a steady controlled turbine shaft speed, as a result, typically the pressure either is below/close/exceeds the pressure target and in many instances needs to be corrected "after" the fact, as a result, a reactive system. The preferred embodiment of the invention above overcomes these problems.

A common monitoring/boost control strategy on prior art high performance turbochargers is to monitor shaft speed, to ensure the turbo does not exceed a given shaft speed, to accurately maintain this shaft speed via the use of a pressure based (reactive) system is risky as there will be instances where the shaft speed exceeds the limit due to a time delay in the system as the reactive wastegate has the ability to react. By utilising electronic wastegate controller 10 of the preferred embodiment, the position of the bypass valve 22 can be independently mapped in comparison to the turbine shaft speed, as a result a function can be created to ensure that the wastegate is moving in a position according to the turbocharger shaft speed limit or control bandwidth.

Figure 10:
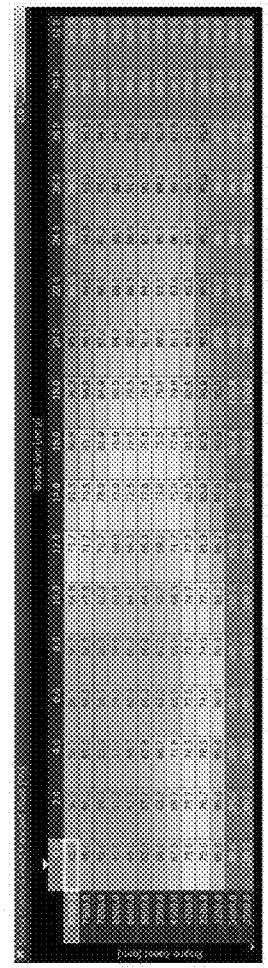
FIG. 10 is a table of boost control for the controller of FIG. 1

In one implementation of the preferred embodiment of FIG. 1, a commercially available Motec™ boost control algorithm was modified to send a PWM signal to controller 10. This was then mapped as position. In order to tune the boost control system, the table below is populated (in an open loop mode) with the expected wastegate valve 22 position corresponding to (100%=FULL CLOSED, 0% FULL OPEN). FIG. 10 is a table of a boost control algorithm operating the wastegate of FIG. 1. This indicates valve position for engine speed (LHS,RPM) with desired boost pressure (horizontal axis, PSI—guage)

During this transient test of the wastegate performance at relatively low boost, it can be seen that the target boost is set to 8 psi, the actual boost slowly increases towards 8 psi in the early part of the graph, at this point the controller 10 is indicating 100%, which is effectively forcing the wastegate in a closed position, ie—all exhaust gas proceeds to the turbocharger so as to spool the turbo. As this is approximately on target for majority of the run, the wastegate valve 22 now opens to a value of around 80-60%, the reason it varies being that turbocharger efficiency is increasing with RPM. Accordingly, more bypass is needed to control the turbo. This 60% value means, the wastegate valve 22 is 60% closed.

Figure 11:
FIG. 11 a graph of boost control as a function of time for the controller of FIG. 1.
Figure 12:
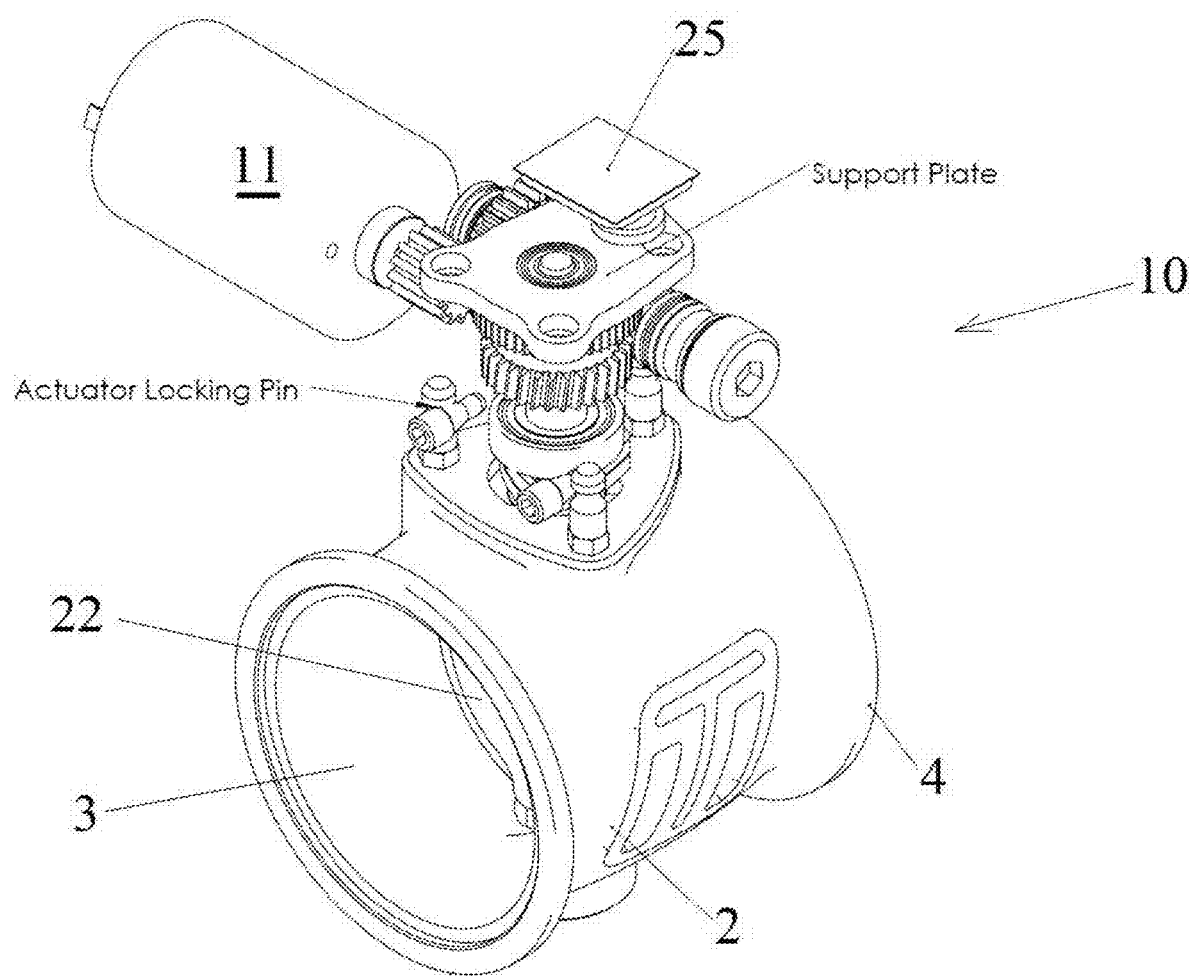
FIGS. 12 to 16 show various views of a turbocharger wastegate controller according to another preferred embodiment of the invention.
Figure 13:
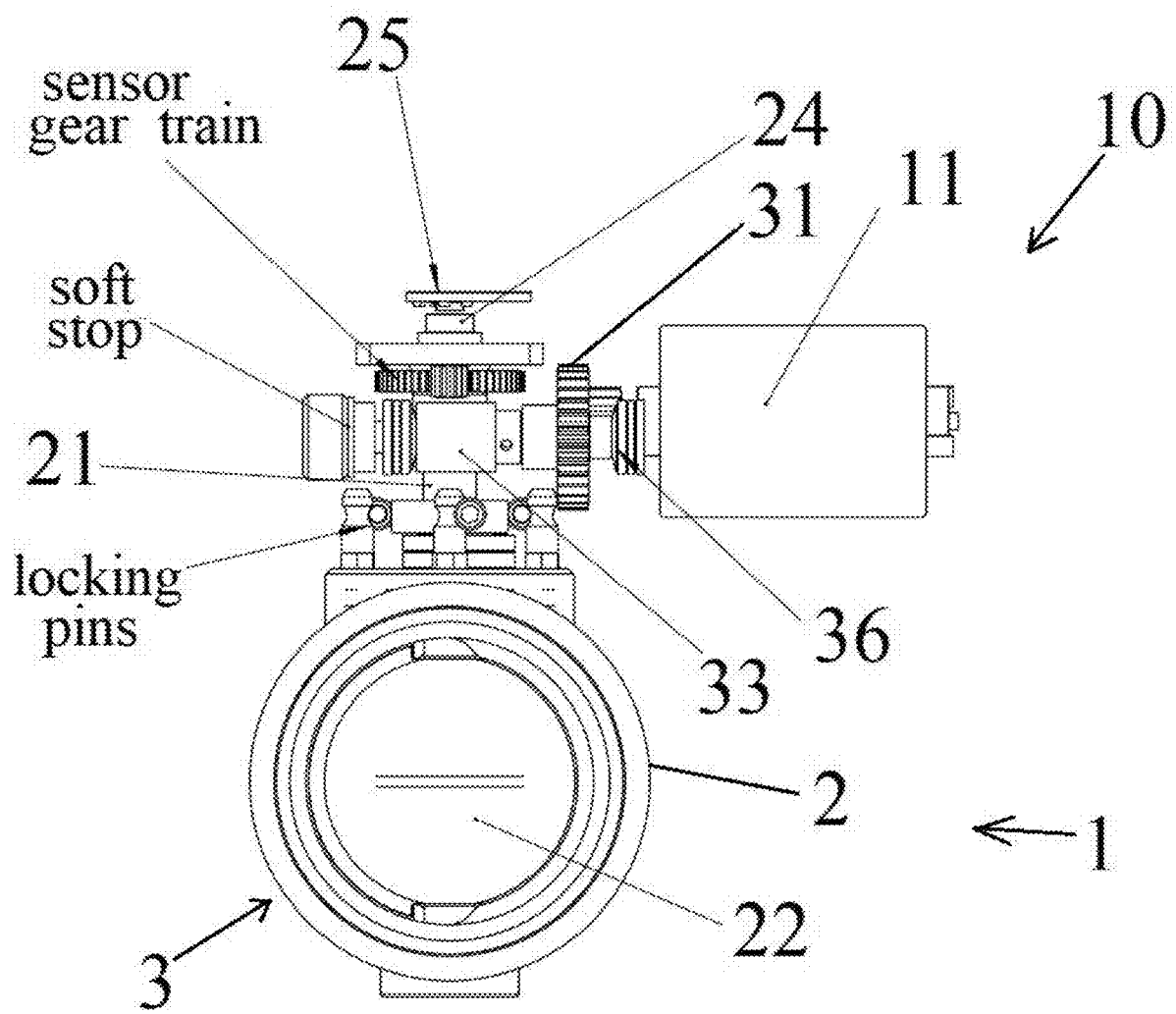
Figure 14:
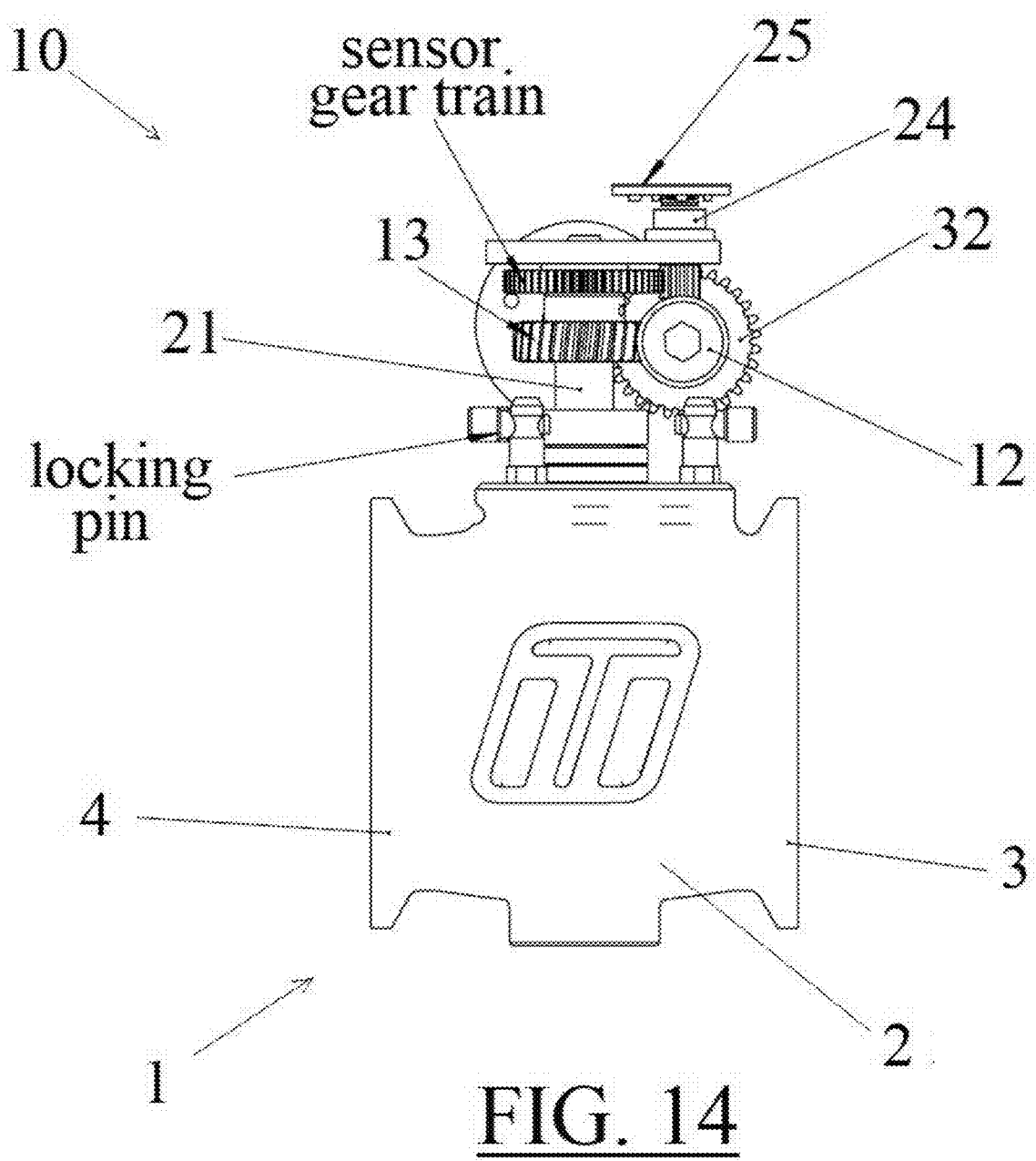
Figure 15:
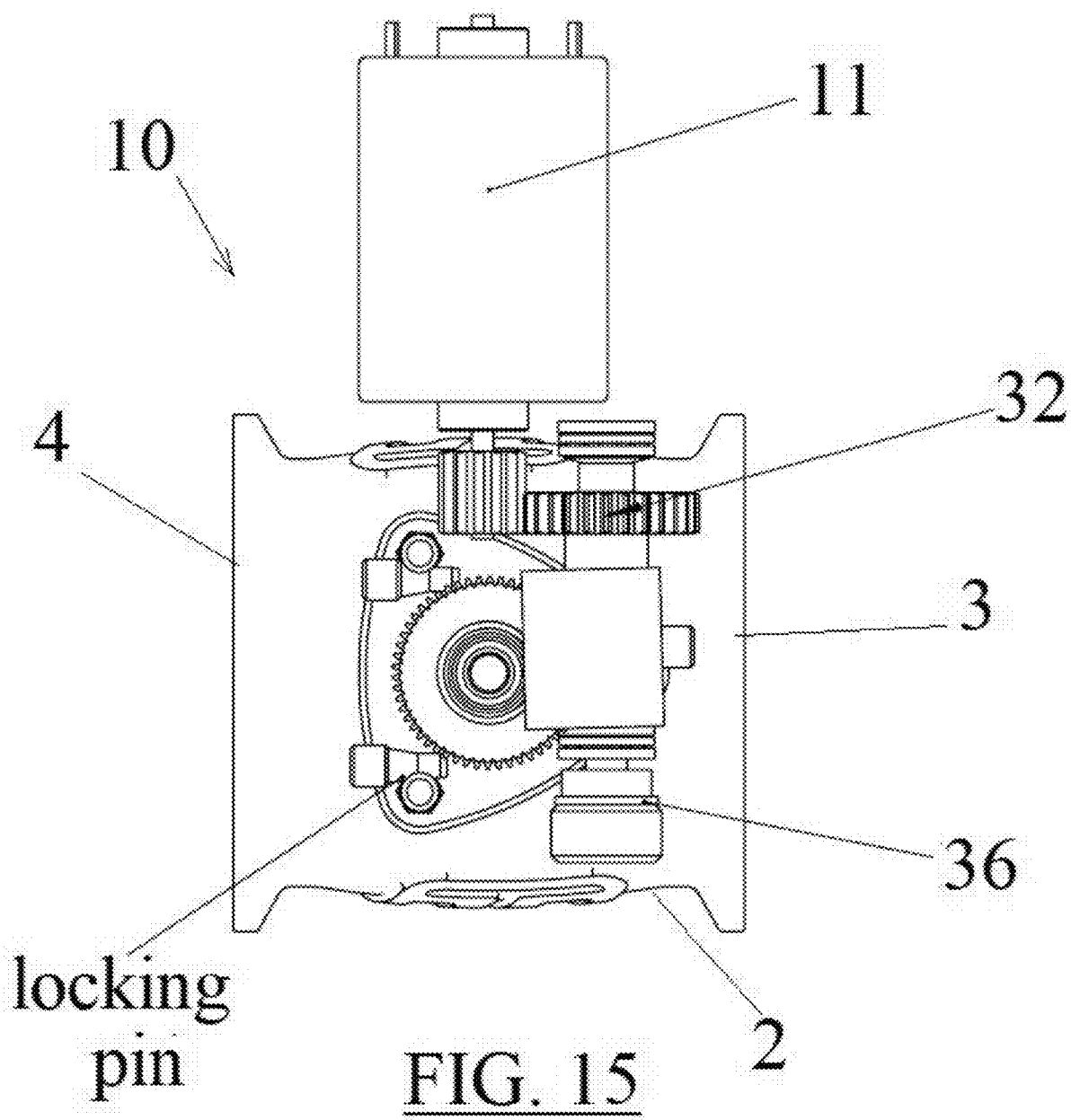
Figure 16:
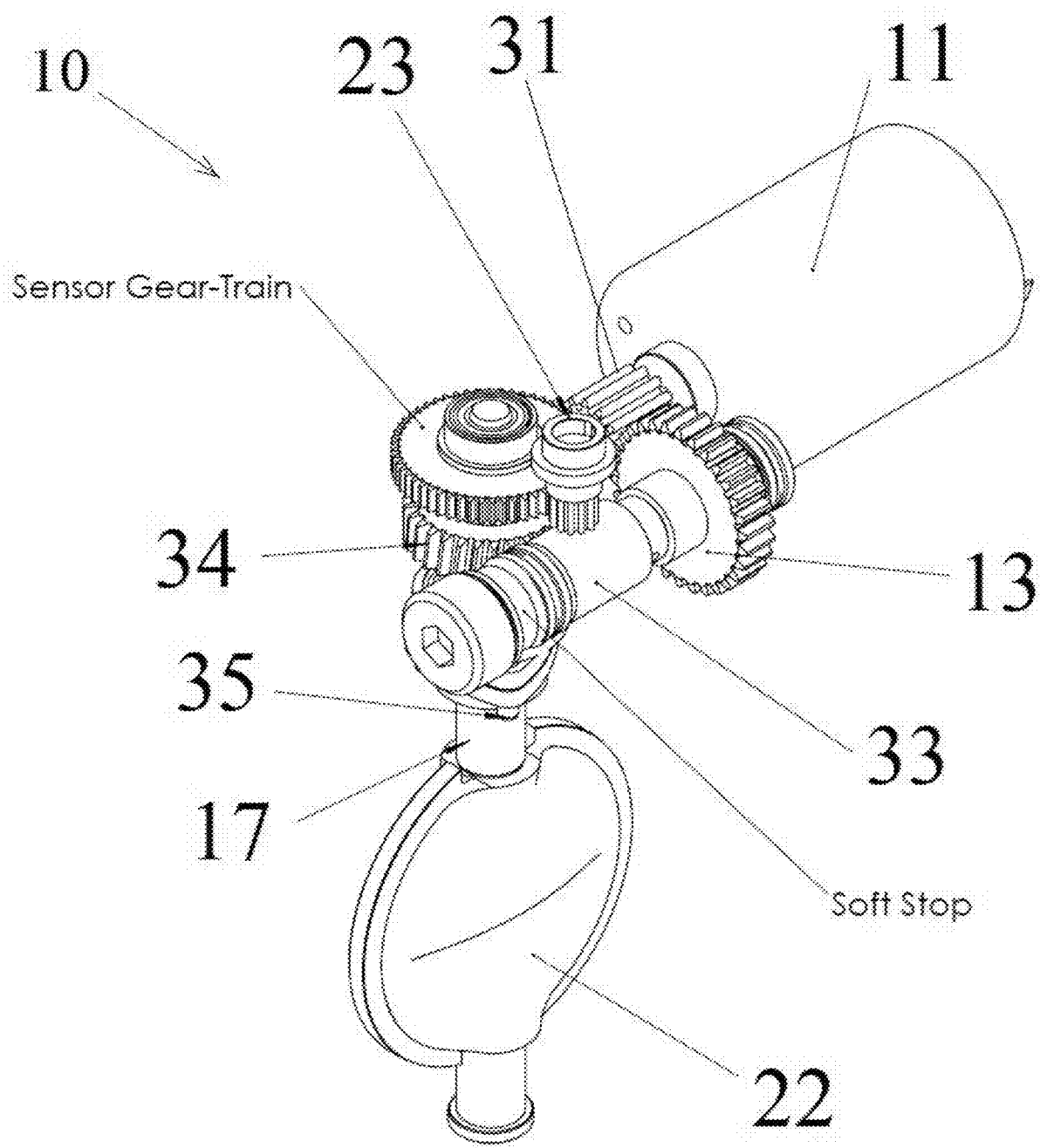
Figure 17:
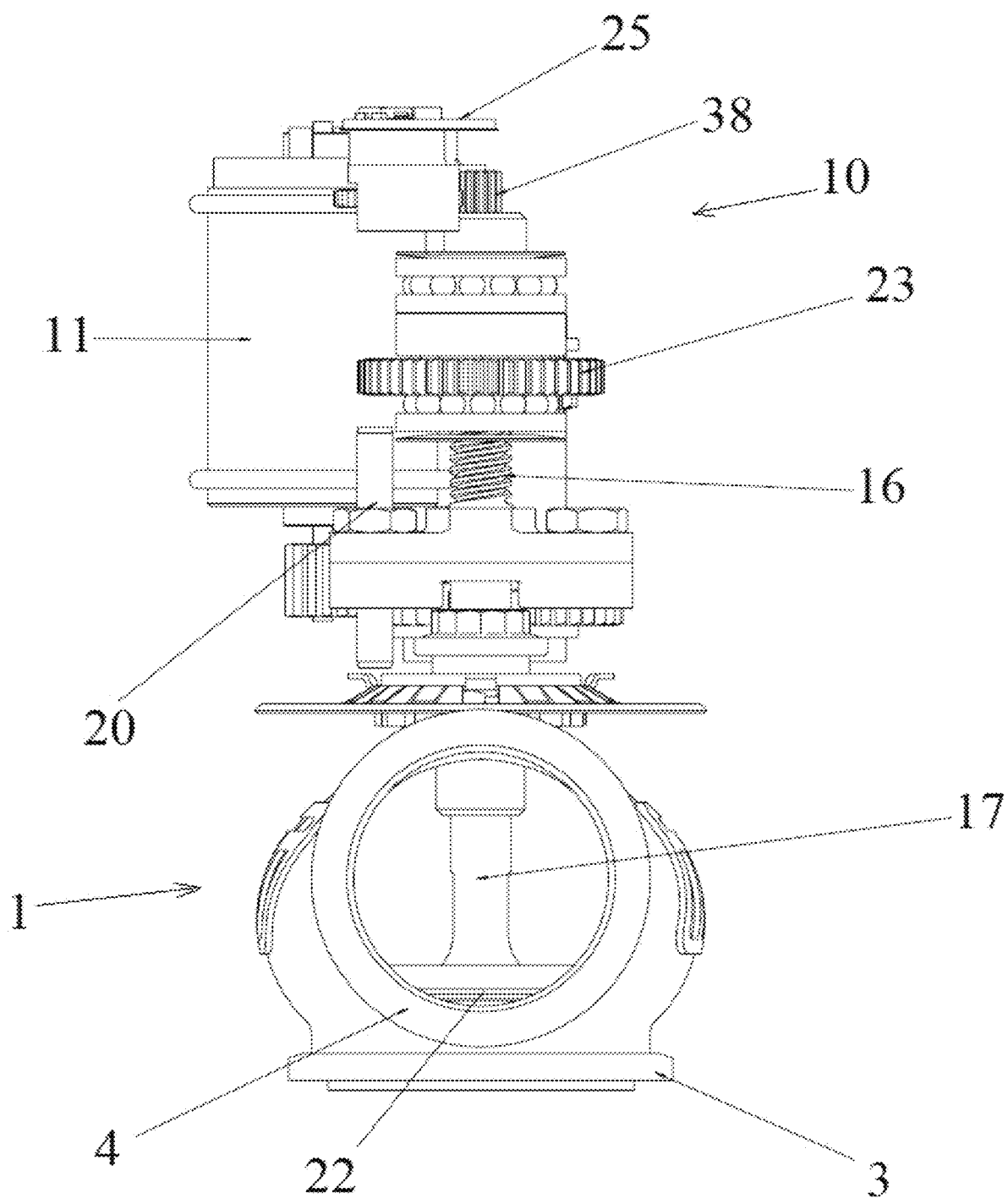
FIGS. 17 to 21 show various views of a turbocharger wastegate controller according to a further preferred embodiment of the invention.
Figure 18:
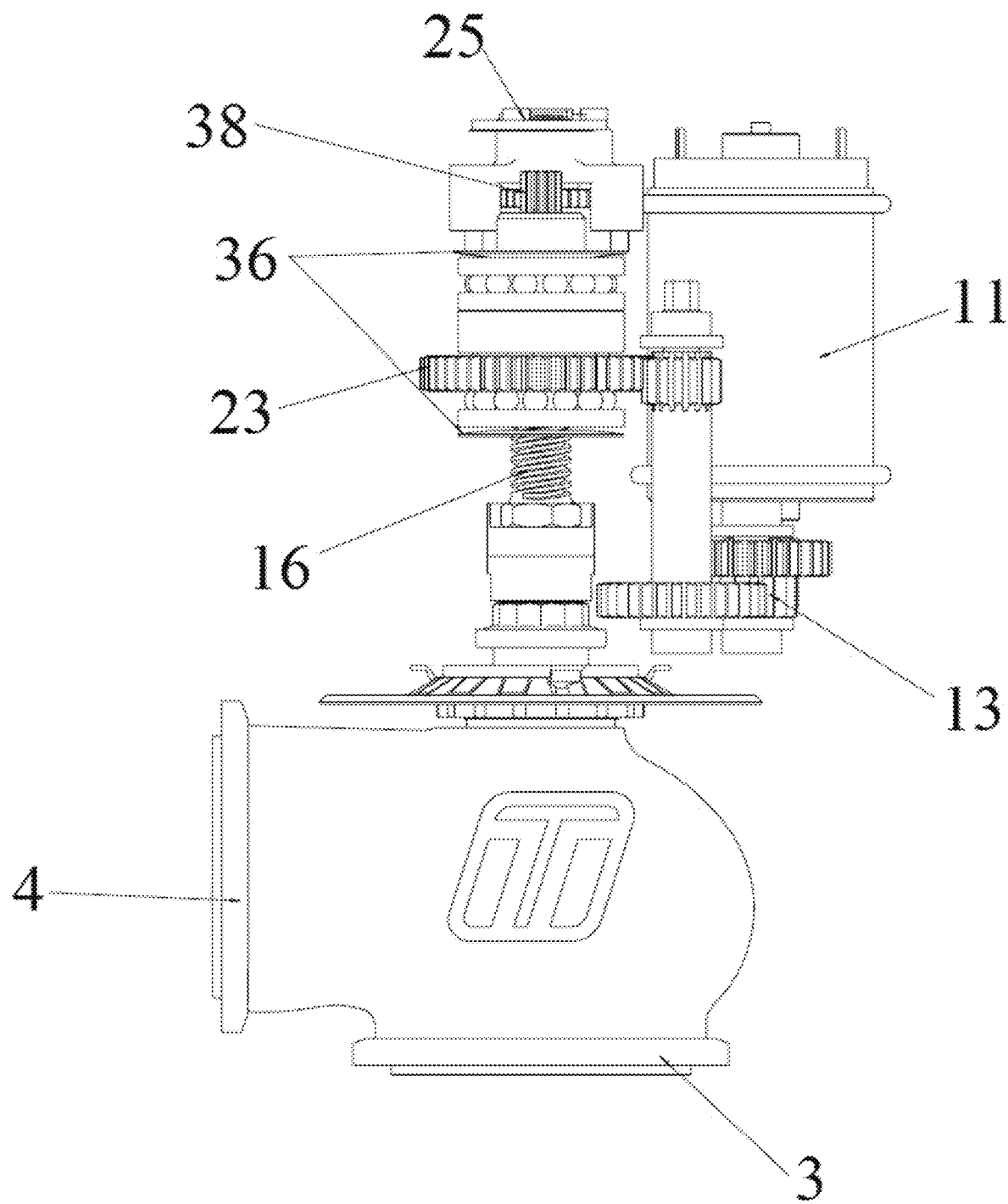
Figure 19:
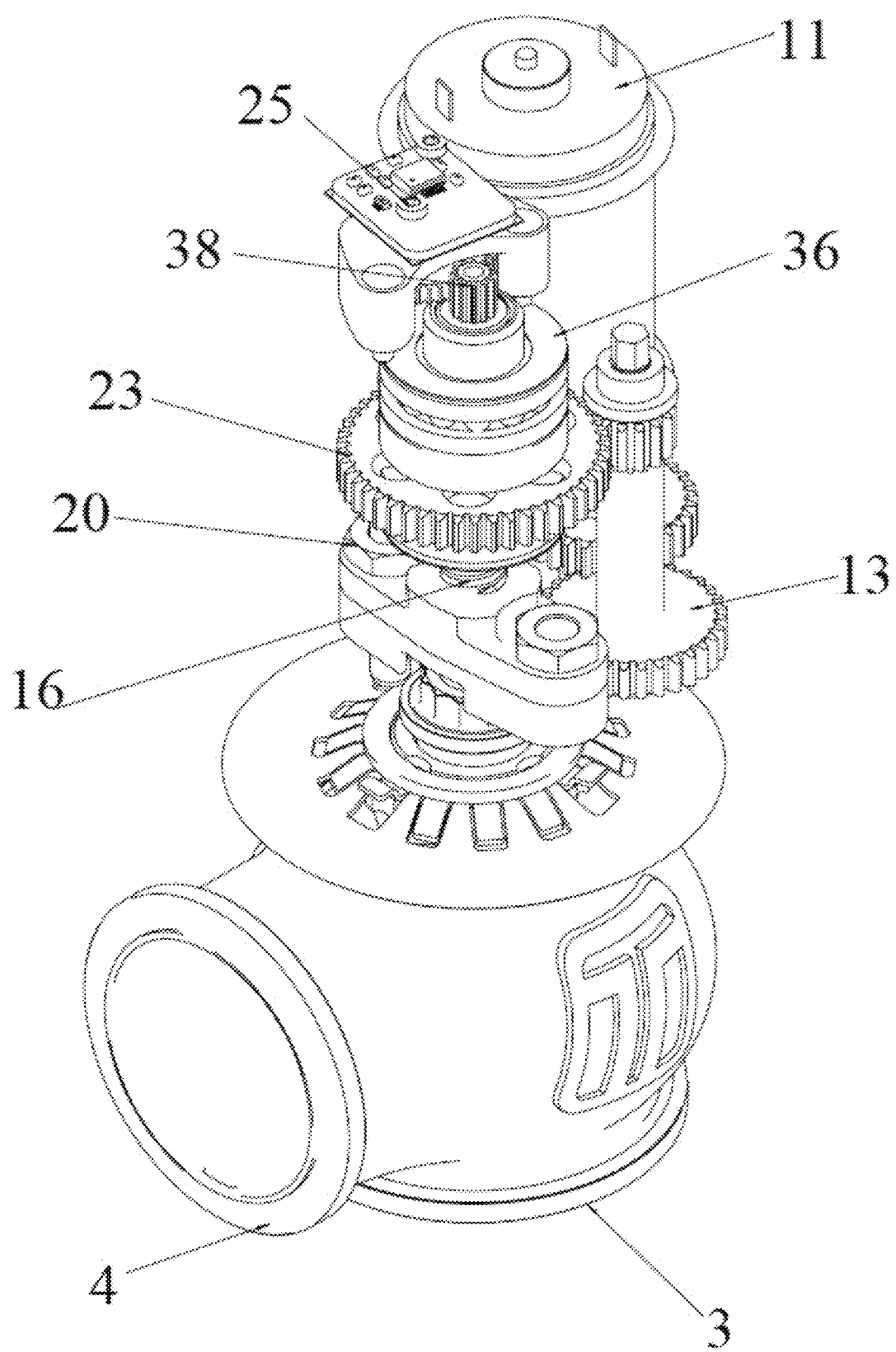
Figure 20:
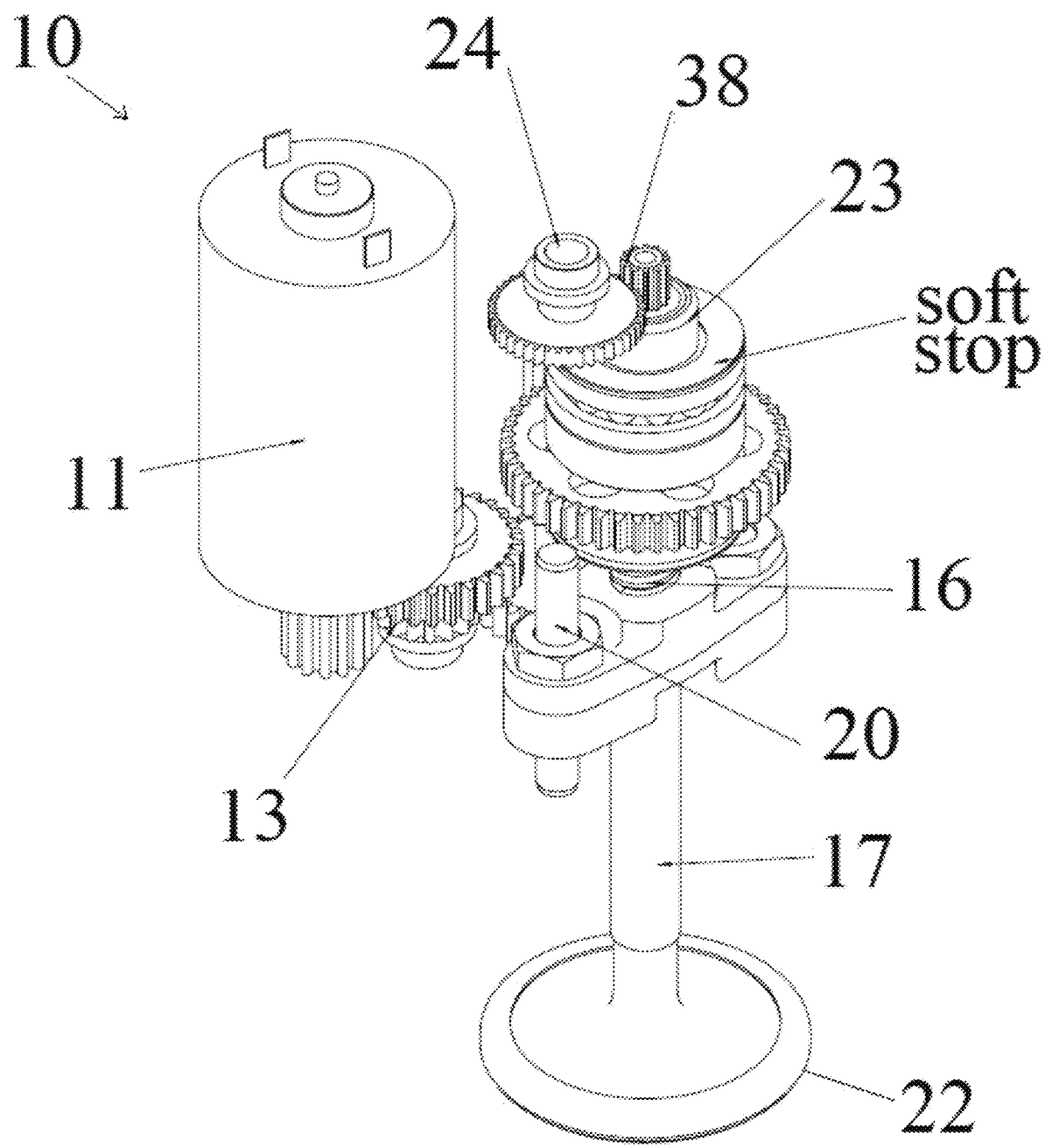
Figure 21:
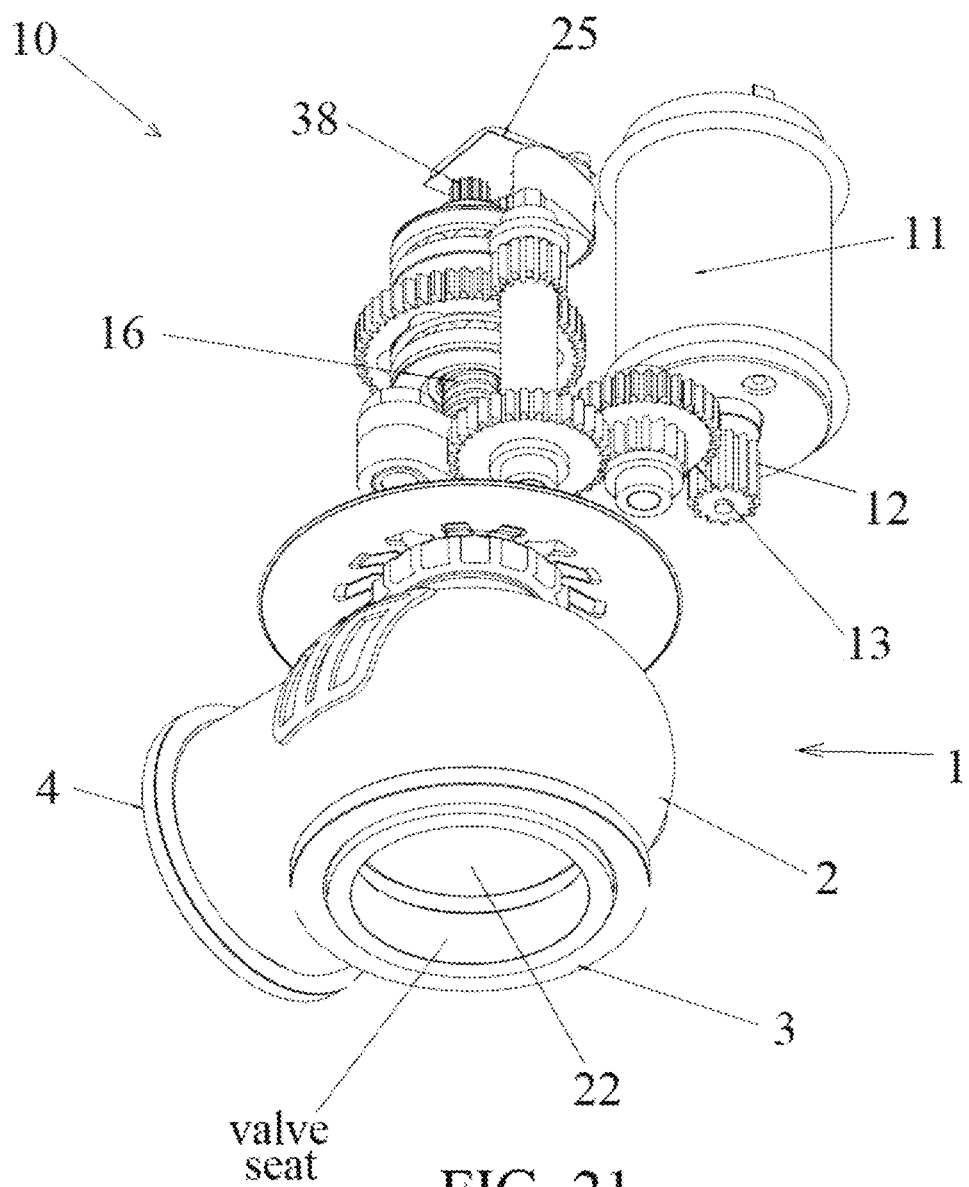

FIG. 11 is a graph of boost control operating the algorithm of FIG. 10 on the wastegate 1 of FIG. 1. The top part of the graph shows the aim boost pressure at 8 psi-g and the measured boost pressure, from operation of wastegate 1. The bottom section of the graph shows the percentage of boost applied as a function of time. It can be seen the wastegate 1 of the preferred embodiment maintains the boost control at about a preferred pressure.

Referring now to FIG. 6, there is shown an elevated perspective view of the wastegate controller 10 described with respect to FIG. 1 mounted to a butterfly valve 22 external wastegate 1. In this embodiment, wastegate 1 includes a body 2 having an inlet 3 and outlet 4. Intermediate inlet 3 and outlet 4, a self-balancing butterfly valve 22 includes an actuation shaft 21 extending from housing 2. Shaft 21 is attached to lead screw 16 head portion 18 whereby linear movement of the lead screw 18 causes corresponding movement of the shaft 21 moving butterfly valve 22 between the fully closed position (shown in FIG. 6) and a fully open position (see FIG. 8). Control signals to operate the servo motor (not seen in FIG. 6) are applied through motor inputs 20 and controlled as per the preferred embodiment with respect to FIG. 1.

Figure 7:
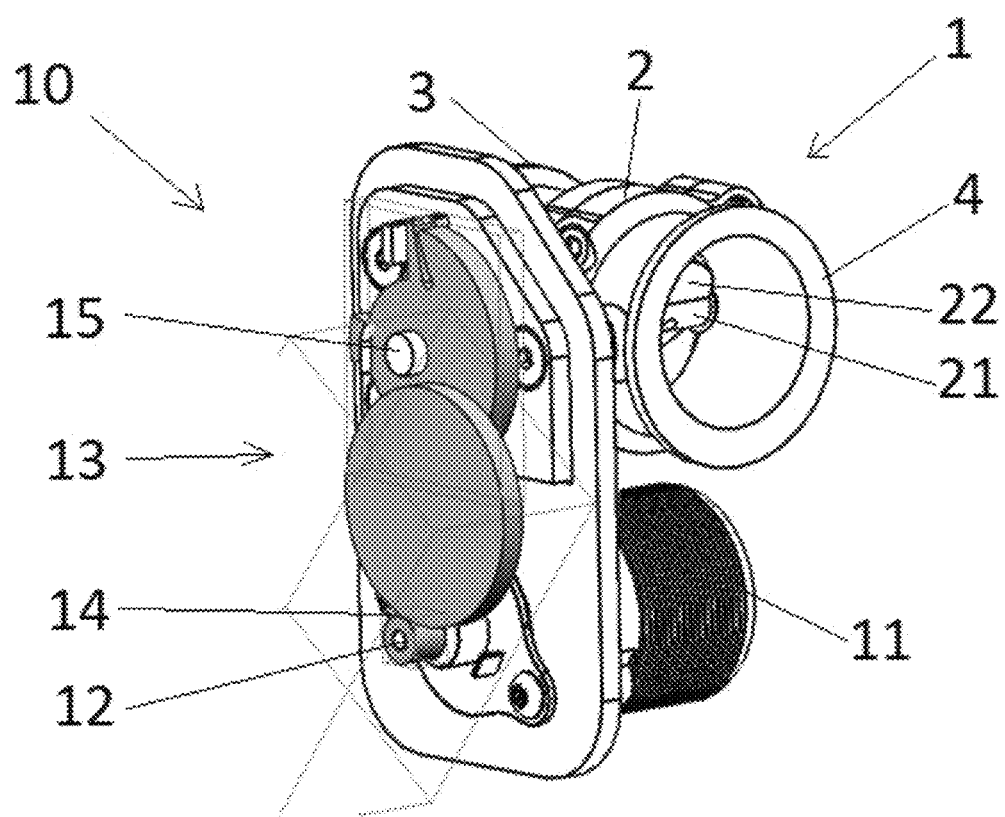
FIG. 7 is a front left perspective view of a turbocharger wastegate controller according to another preferred embodiment attached to an external wastegate.

In FIG. 7 there is shown wastegate controller 10 according to another preferred embodiment attached to an external wastegate 1. This embodiment is similar to that of FIG. 6, however, motor 11 output shaft 12 is connected to gear train 13 whereby gear train output 15 is connected directly to the shaft 21 of the butterfly valve 22. Rotation of output shaft 12 causes geared rotation of the gear train output 15 which directly drives or rotates the butterfly valve 22 shaft 21. In this embodiment, lead screw 16 is removed and the servo motor 11 output shaft 12 includes a magnetic encoder to allow positional operation of the motor 11 as per the first preferred embodiment.

Turning now to FIGS. 8 & 9, there is shown wastegate controller 10 according to a further preferred embodiment attached to an external wastegate 1. This is similar to FIG. 7 whereby motor 11 output shaft 12 is connected directly to the butterfly valve 22 actuator shaft 21 whereby rotation of motor shaft 12 correspondingly rotates butterfly valve 22 so as to move between the fully closed and fully open positions. In this way, gear train 13 is removed and the self-balancing nature of the butterfly valve (as compared to a poppet valve or gate valve) facilitates removal of the gear box.

It will be appreciated a self-balancing butterfly with offset mounting housings allows the control valve to "seal" on both faces meaning that the exhaust gas pressure will not overcome the valve even in excessive backpressure environments and the offset seal means that the face of the butterfly can be used as a sealing surface. Further, the DC servo motor 11 is used to drive a specific torque multiplier (gear train 13) to actuate the butterfly valve, as there is only 90 degrees of motion required. A high-speed DC motor 11 can be translated via a gear train 13 to a slower output speed while maintaining wastegate blade actuation time and benefits of increased torque output.

By relying on a butterfly valve design, the wastegate can be designed as small as possible for a given valve diameter, ensuring that maximum flow vs diameter relationship can be achieved. Additionally, a converging-diverging nozzle can be incorporated into the design to allow for further performance benefits at choked flow. The preferred embodiments of the invention also allows control of OE and after-market wastegate families such as pneumatically controlled butterfly valves.

In some preferred embodiments, there is advantageously provided means for a vehicle end user to implement controller 10 without having to modify any manifolds. That is, without having to remove an existing wastegate and replace with the present invention. Controller 10, being an electronically actuated device employs a control algorithm. The external wastegate 1 of the preferred embodiment can be 'a universal device' having flexibility to be used and successfully incorporated in many environments.

As noted in the control means described with respect to the first preferred embodiment, use of existing control techniques for pneumatically operated wastegate systems, practically all known devices (typically solenoids) are controlled via a PWM signal at varying frequencies. Accordingly, the control device 10 of the preferred embodiment is configured to accept a PWM signal at a fixed (published) frequency, say ~30 Hz to ensure compatibility for devices without frequency adjustment. Ideally the controller should work off position-based commands via PWM, ie 0% PWM=closed, 100% PWM=100% open.

By relying on PWM driven logic the device to be considered as universally applicable being compatible with existing boost controller devices that output a PWM signal. It will be appreciated that further manipulation of the input signal can be employed to ensure relatively linear motion or response with requested PWM signal and becomes a "motor tuning" requirement. Further, important data such as actuator controller 10 temperature, wastegate valve 22 position, theoretical flow (if known pressure), average actuator error, etc can be transmitted and monitored via capable CAN devices to setup predictive fail safes or further fine tuning of controller 10.

Advantageously, preferred embodiments of the present invention can utilise the electronic wastegate controller 10 so as to position of the wastegate/bypass valve 22 (weather this is rotary or poppet) which can be independently mapped in comparison to the turbine shaft speed, as a result a function can be created to ensure that the wastegate valve 22 is moving in a position according to the turbocharger shaft speed limit or control bandwidth.

While the electronic wastegate controller 10 and wastegate valve 22 may be able to respond quicker than the turbocharger shaft speed, being much more responsive than the turbocharger due to inertia is equivalent to anti-aliasing with sensor sampling. Advantageously, this allows for the controller 10 not to operate in zones of "aliasing" and basically undesirable control effects begin to occur due to ghosting of signals.

It will be noted that a blow off valve (operating on the output side of the turbocharger) can be used in conjunction with preferred embodiments of the present invention whereby active blow off valve management allows for instantaneous boost bypassing and without needing manifold/pressure in the system to operate. Further, it will be appreciated that for torque management purposes, the wastegate valve 22 can be opened allowing for maximum bypassing from the throttle blade and thus drastically reducing the torque produced by the engine. This is particularly advantageous for applications such as drag/circuit racing since turbine shaft speed momentum is critical and anything that diminishes the effectiveness of the turbine spool is detrimental (eg cutting cylinders). As such wastegate controller 10 and wastegate 1 together with a blow off valve (not illustrated) can be combined together with active turbine shaft speed control to pre-spin the shaft to maximum speeds and then close the BOV/open the wastegate valve 22 to maintain that shaft speed as the ECU maintains torque management via ignition timing/throttle position.

Referring to FIGS. 12 to 16, there is shown different views of a wastegate 1 having a wastegate controller 10 according to another preferred embodiment of the invention. In this preferred embodiment, the wastegate 1 includes a butterfly valve 22 similarly to the preferred embodiments shown FIGS. 6 to 9. As noted above, the butterfly valve 22 unlike the poppet valve 22 (of FIG. 1) is advantageously non directional and can be plumbed in forward or reverse flow with no effect on performance. The controller 10 establishes desired position and provides an output duty cycle on a full bridge output in the desired polarity, for example see the table of FIG. 10. Electrical energy to power the wastegate valve 22 is fed into DC motor 11 converting electrical energy into rotational energy of the geared leadscrew 16. A spur cut pinion gear 31 is attached to the shaft 12 of the DC motor 11 meshed with a reduction gear train 32 that amplifies the torque of the DC motor to a higher desired value so that smaller motors can be used.

A worm gear 33 is attached to the reduction gear 32 to translate the rotational movement 90 degrees through a worm wheel 34 for the final gear reduction. Due to the characteristic that butterfly valves are self-balancing, the torque required to rotate the valve 22 is low compared to the poppet valve 22 of the embodiment of FIG. 1 and therefore can be significantly faster than the equivalent poppet style valve. A drive shaft 17 is joined to the worm wheel 34 and transfers energy from the worm through drive shaft 19 onto the butterfly valve 22. The butterfly valve 22 rotates and comes to rest when the edge of the blade meets a body seating against a step 40 in the body. In the preferred embodiment Belleville washers 36 are used on the worm gear shaft 34 which acts to soften the forces produced when the valve comes to a stop and the motor 11 is still driving the valve 22. This reduces the stress in components and reduces the torque required to undo the worm gear 33 from any bind.

Similarly to the embodiments described above, a sensor gear-train is used to convert the 90 degree rotation of the valve into 360 degree movement at the encoder magnet 24. Furthermore, this preferred embodiment includes a Hall Effect encoder 25 which advantageously has a linear detection range of 0-360 degrees correlating to a 0-100% duty cycle output. It will be understood the detection range of 0-360 refers to the range of motion the sensor 25 can detect and the shaft the magnet 24 is attached to is geared to use the largest amount of this rotation without going over. It will also be appreciated that a second order RC (resistor capacitor) filter can be employed to convert the Hall Effect sensor 25 output duty cycle to a readable analogue voltage of 0 to 5 Volts. The output of the sensor is preferably read by a control unit and calculations can be performed to achieve the desired position based on actual valve 22 position.

A further preferred embodiment of the wastegate 1 controller 10 is shown in various views in FIGS. 17 to 21. This includes a poppet or linearly movable valve 22 similarly to the embodiment shown in FIG. 1. The wastegate 1 is installed onto a manifold with the inlet 3 placed before the entry to the turbocharger (not illustrated). Although not illustrated the outlet 4 of the wastegate 1 can be either plumbed back into the exhaust system post turbocharger or vent directly to atmosphere. The controller 10 establishes the desired valve 22 position and provides an output duty cycle on a full bridge output in the desired polarity. Here, a spur cut pinion gear 31 is attached to the shaft 12 of the DC motor 11 meshed with a reduction gear train 32 that amplifies the torque of the DC motor 11 to a higher value. The geartrain 32 is preferably all metal and is held in place by self-lubricating oil impregnated sintered bronze bushings, for example. The reduction gear train 32 is meshed to a bronze leadscrew "nut" 23 is supported by a radial bearing and two thrust bearings. A lead screw 16, having TR 10×4 (P2) thread in the preferred embodiment, is screwed into the "nut" 23 and with guide pin 20 that prevents rotation so that the lead screw 16 is able to convert rotational movement of the "nut" 23 into linear movement for corresponding movement of poppet valve 22.

The TR 10×4 (P2) leadscrew thread is preferred in some embodiments due to its desired characteristics of being on the edge of self-locking with bias towards self-locking. This means that with high exhaust pressures acting on the bottom of the valve, the mechanism will not cause rotation of the "nut" 23 and hence the power required to hold position of the valve 22 is minimal to nil provided the valve was at the desired position. Self-locking in a threaded connection occurs at a efficiency below 50% where the efficiency is the mechanical efficiency of the mechanism between the lead screw 16 and lead screw nut 23. An efficiency of less than 50% in this system will result in a self-locking phenomenon i.e. a force applied along the axis does not allow the mechanism to move relative to each other. Efficiency greater than 50% would result in the leadscrew 16 rotating and moving relative to the nut 23. By targeting an efficiency close to but not more than 50% the mechanism has the best compromise between speed and torque required to drive the "nut" 23 and lowers risk of the mechanism binding due to high torque values against a fixed mating component (i.e. the locking mechanism of a jam nut on the leadscrew thread).

As seen in the drawings of this embodiment, the leadscrew 16 is directly attached to the top of the valve 22 with shaft 17 in between producing a direct relationship between rotation of the "nut" 23 and position of the valve 22. As with the embodiment of FIG. 12, a belleville washer 36 is used at each end of the "nut" 23 assembly against the thrust bearings. These Belleville washers 36 are a stiff spring that act as a form of damper when the end of the valve 22 stroke is achieved, instead of deceleration going to infinity and hence the forces on the system, the stiff Belleville washers 36 allow the force to be distributed over a few degrees of rotation of the "nut" 23. The purpose of this is to reduce stress in the components for longevity and to reduce the amount of force required to break free of the "jam nut" condition.

Connected to the top of the "nut" 23 is a second gear-train 38 used specifically for the hall effect sensor 25. This gear train 38 reduces the multi turn of the "nut" 23 into a usable single turn at the sensor magnet 24. The preferred hall effect encoder 25 has a linear detection range of 0-360 degrees correlating to a 0-100% duty cycle output. The use of a second order RC (resistor capacitor) filter can convert the sensor output duty cycle to a readable analogue voltage of 0 to 5 Volts. The output of the sensor 25 is can be read by a control unit (not illustrated) and calculations can be performed to achieve the desired valve 22 position based on actual position.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:
1. A turbocharger wastegate controller comprising:
a servo motor having an electrical supply input and a motor output shaft;
a gear train having an input connected to said motor output shaft and a gear train output, said gear train having a predetermined input to output gear ratio;
a lead screw having an elongate shaft with a lead screw head configured to be attached to a wastegate actuator, said lead screw being threadedly engaged with the gear train output such that rotation of the gear train output in the first direction moves said lead screw linearly in a first direction toward a fully open actuator position and rotation in the opposite direction toward a fully closed actuator position;
a lead screw nut threadedly engaged with the lead screw with a mechanical efficiency therebetween of less than 50%;
characterised in that said electrical supply input to said servo motor is controlled to modify the wastegate position to control boost pressure of a turbocharger.

2. The controller according to claim 1 wherein said lead screw head includes an elongate arm.

3. The controller according to claim 1 including a lead screw nut disposed adjacent the end of said lead screw opposed to said lead screw head, said lead screw nut adapted to be mounted to a controller body such that rotation of said lead screw moves said lead screw linearly away or toward said controller body.

4. The controller according to claim 1 wherein said servo motor electrical input is provided by the ECU of an engine to which a turbocharger is attached.

5. The controller according to claim 1 wherein said motor is adapted to wind said lead screw between said fully closed and fully open actuator positions in less than 500 ms, preferably less than 250 ms; most preferably less than 125 ms.

6. The controller according to claim 1 wherein said motor electrical supply input is controlled by: (i) a vehicle CAN bus operating a servo motor PWM input drive controlling a DC voltage input; preferably wherein 0% PWM duty cycle input causes said lead screw to be in said fully closed actuator position and 100% PWM duty cycle causes said lead screw to be in said fully open actuator position; or (ii) an electronic signal indicative of required engine exhaust bleed through a wastegate to maintain or provide a desired turbocharger output.

7. The controller according to claim 1 wherein movement of said actuator from said fully closed position bleeds engine exhaust to atmosphere or to an engine exhaust downstream of a turbocharger from said engine exhaust.

8. The controller according to claim 1 mounted to a housing having an inlet configured for fluid communication with an engine exhaust outlet and an outlet adapted to channel engine exhaust gas therethrough to atmosphere or an engine exhaust downstream of a turbocharger, such that movement of the lead screw from the fully closed position reduces pressure.

9. The controller according to claim 1 wherein said servo motor is configured to move said lead screw in response to a power failure to a position being 30% to 60% of said actuator fully open position.

10. A controller according to claim 1 wherein:
said lead screw includes a 10 mm diameter with a 2 mm thread pitch; and/or
said gear train provides a gear reduction in the range 2:1 to 30:1; and/or
said servo motor has a stall torque between 0.10 to 0.30 Nm; and/or
said servo motor provides an average torque of 0.15 to 0.45 Nm.

11. An external turbocharger wastegate having a turbocharger wastegate controller according to claim 1, the wastegate comprising a housing having an inlet port in communication with an engine exhaust outlet upstream of a turbocharger, and an outlet adapted to be vented to atmosphere or said vehicle exhaust downstream of said turbocharger.

12. The controller according to claim 1 including a poppet valve mounted to said lead screw head, said poppet valve moving between the wastegate fully closed actuator position and the fully open actuator position, preferably said poppet valve has a diameter of between 20 mm to 80 mm most preferably 40 mm to 60 mm.

13. The controller according to claim 12 wherein said poppet valve is adapted to move into said fully closed actuator position against an engine exhaust pressure of between 10 bar to 200 bar; preferably between 20 bar to 40 bar.

14. The controller according to claim 1 wherein said motor includes an encoder magnet disposed at the end of said lead screw opposed said lead screw head, said encoder magnet configured to monitor rotational motion of said lead screw.

15. The controller according to claim 14 wherein said encoder includes at least one Hall effect sensor.

16. The controller according to claim 1 wherein said motor is configured to rotate said lead screw between said fully closed actuator position and a predetermined linear distance corresponding to said fully open actuator position.

17. The controller according to claim 16 wherein said predetermined linear distance is between 10 mm to 30 mm, or between 12 mm to 19 mm.

18. A turbocharger wastegate controller comprising:
a servo motor having an electrical supply input and a motor output shaft;
a gear train having an input connected to said motor output shaft and a gear train output, said gear train having a predetermined input to output gear ratio;
a lead screw having an elongate shaft with a lead screw head configured to be attached to a wastegate butterfly valve actuator, said lead screw being threadedly engaged with the gear train output such that rotation of the gear train output in the first direction moves said lead screw linearly in a first direction toward a fully open actuator position and rotation in the opposite direction toward a fully closed actuator position;
a lead screw nut threadedly engaged with the lead screw with a mechanical efficiency therebetween of less than 50%;
characterised in that said electrical supply input to said servo motor is controlled to modify the wastegate position to control boost pressure of a turbocharger.

* * * * *